F. S. MERRILL.
AUTOMOBILE TRUCK WHEEL.
APPLICATION FILED DEC. 27, 1915.

1,219,022.

Patented Mar. 13, 1917
2 SHEETS—SHEET 1.

Witness.
H. B. Davis.

Inventor,
Francis S. Merrill
by Noyes & Hammann
Atty's

F. S. MERRILL.
AUTOMOBILE TRUCK WHEEL.
APPLICATION FILED DEC. 27, 1915.

1,219,022.

Patented Mar. 13, 1917
2 SHEETS—SHEET 2.

Witness.
H. B. Davis

Inventor,
Francis S. Merrill
by Boyer & Hamman
Attys

UNITED STATES PATENT OFFICE.

FRANCIS S. MERRILL, OF AMESBURY, MASSACHUSETTS.

AUTOMOBILE-TRUCK WHEEL.

1,219,022.  Specification of Letters Patent.  Patented Mar. 13, 1917.

Application filed December 27, 1915. Serial No. 68,630.

*To all whom it may concern:*

Be it known that I, FRANCIS S. MERRILL, a citizen of the United States, residing at Amesbury, in the county of Essex and State of Massachusetts, have invented an Improvement in Automobile-Truck Wheels, of which the following is a specification.

This invention relates to certain improvements in wheels especially designed for use on automobile trucks or like heavy vehicles.

The chief objection to the use of wood wheels, which comprise a hub, spokes and rim, for heavy vehicles, is that the excessive strain which is placed thereon causes the spokes to become loose in a comparatively short time.

It is customary, in the manufacture of wooden automobile wheels, to mount an endless metal rim, which is adapted to receive the rubber tire, on the rim of the wooden wheel, and one of the objections to the use of a solid wood block wheel, in this relation, is that moisture is liable to cause them to swell, so as to increase the circumference thereof and cause breakage of the metal rim.

The object of my invention is to provide a solid wood wheel which is strong and durable and is, therefore, especially adapted for use in heavy vehicles and which will not be affected by moisture, so that the circumference thereof will be increased.

I accomplish this object by the means shown in the accompanying drawing, in which:—

Figure 1 is a side elevation, and,

Fig. 2 an edge elevation, of a wheel embodying my invention.

Figure 1:
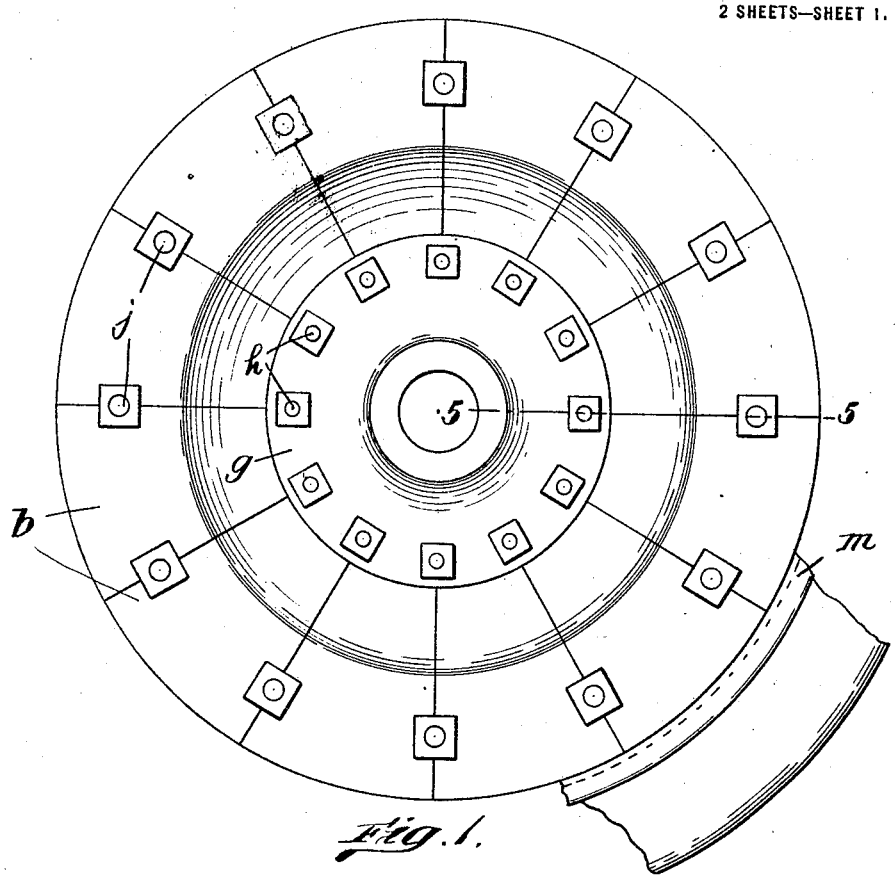
Figure 2:
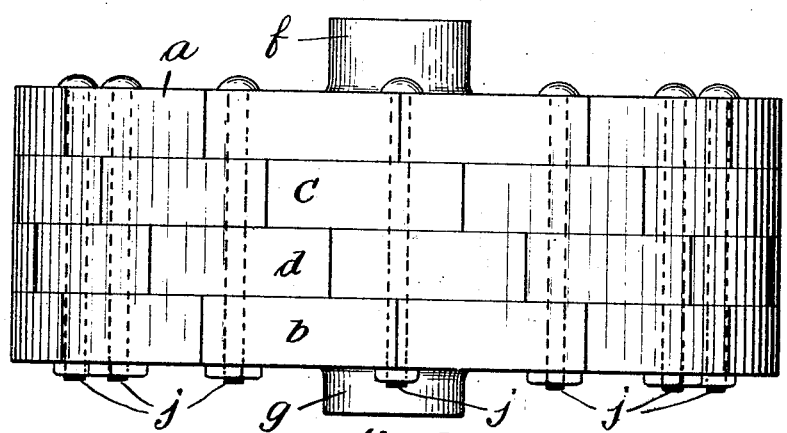
Figure 3:
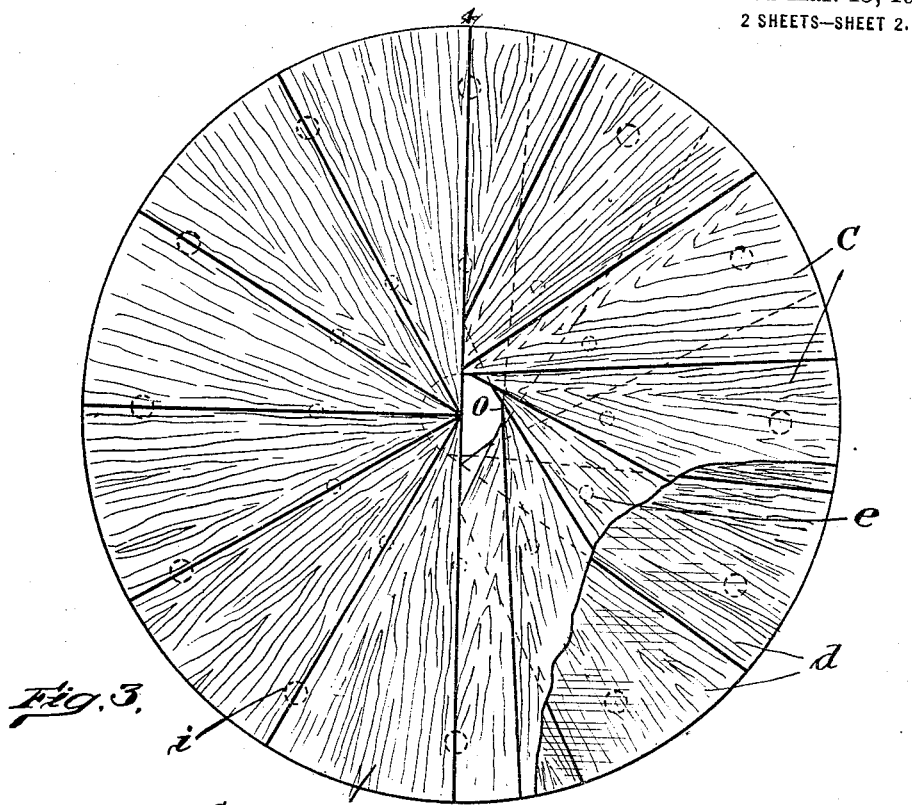
Fig. 3 is a side view of a partly constructed blank from which the wheel is made.
Figures 4, 5:
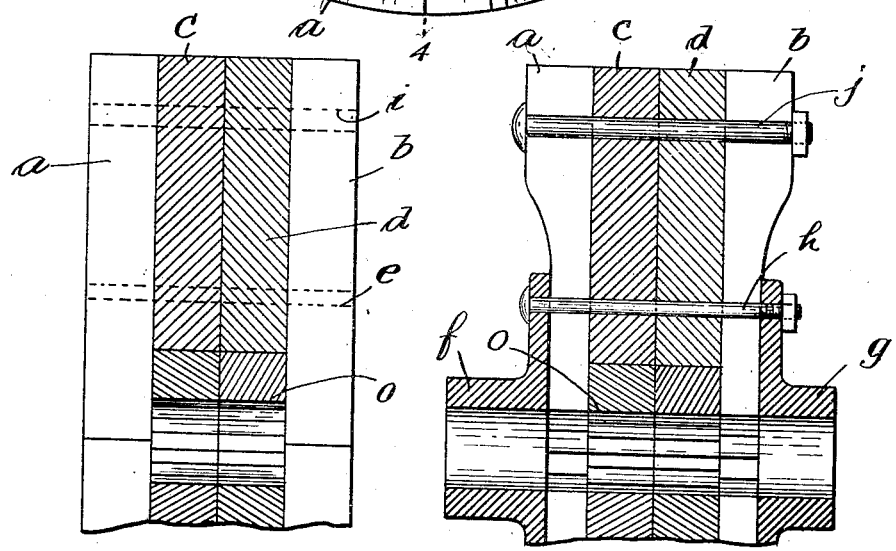
Fig. 4 is a sectional view taken at the line 4—4 of Fig. 3.
Fig. 5 is a sectional view taken at the line 5—5 of Fig. 1.

The particular embodiment of my invention illustrated consists of a wheel built up of four layers of sector shaped pieces of equal thickness, all formed of wood, the grain of which, in each instance, extends approximately parallel to the vertical bisector of the piece. The two outer layers of the wheel each comprise a series of sector shaped pieces $a$ and $b$, which are arranged in exactly radial positions, so that, before the hole for the axle is bored, the vertices thereof all meet at the center, or axial line of the wheel, as shown in Fig. 3. The pieces $a$, $b$, are of equal size and are arranged directly opposite each other, so that the abutting joints between any two pairs of opposite pieces are in the same radial plane of the axis.

The two inner layers each comprise a series of sector-shaped pieces $c$ and $d$, respectively, of equal thickness, and, while they are arranged with their vertices adjacent the center, are not arranged in exactly radial positions, so that the vertices thereof meet at the center, but, as best shown in Fig. 3, extend to points adjacent the center, being arranged somewhat obliquely to an exactly radial position, so that their vertical bisectors extend obliquely to the radii which they intersect, the inner side of each sector being tangent, near its vertex, to a cylindrical surface which is approximately of the same diameter as that of the wheel axle, and has its center at the axis of the wheel. The pieces of the two layers are also arranged at opposite angles of obliquity, the pieces $c$ being shown as extending from the center to the right, and the pieces $d$ to the left, so that each piece of one layer extends across several joints of the adjacent layer. The peripheral edges of all the pieces are concentric with the axis of the wheel.

In building up the wheel, in accordance with my invention, the sides and edges of the pieces, which comprise the two inner layers, are coated with a strong adhesive, before they are placed in position, while the inner sides and abutting edges of the outer layers $a$ and $b$ are also coated with an adhesive. As thus arranged, the parts are then forced together and held under a strong pressure until the adhesive becomes hard, so that all the pieces are adhesively connected, and form a solid mass. This mass is then centered and the center hole $o$, for the axle of the wheel, is bored, after which the periphery is turned down. Two series of holes $e$ and $i$, indicated in dotted lines in Fig. 3, are formed therein, one series adjacent the periphery and the other adjacent the center, being bored at regular intervals through the wheel, parallel to its axis, and said holes having their center lines in the lines of the abutting joints between the pieces of the outer layers $a$ and $b$. The arrangement is such, however, that none of the holes pass through the joints between the pieces $c$ and $d$ of the inner layers, but all of them pass through intermediate portions of said pieces.

Two metal hubs $f$ and $g$ are provided, and are secured on the opposite sides of the wheel, in axial alinement with the central hole $o$, by means of bolts $g$, which pass through holes $e$, and a series of bolts $j$ are passed through the holes $i$, and the heads and nuts thereon are clamped against the outer sides of the wheel, each head and nut engaging two adjacent pieces, as shown.

The purpose of the above specified arrangement of the bolts $j$ is to provide a positive clamp on the edges of the outer sector shaped pieces $a$, adjacent the periphery, so that any tendency which the edge-portions of said outer pieces $a$ may have to bulge outwardly at the joints will be prevented.

With the sector shaped pieces thus arranged, the grain of the wood in each piece will extend practically radially with relation to the axis of the wheel, as indicated in Fig. 3. It is a well-known fact that wood, under the influence of moisture, will swell laterally of the grain, but that it will not swell longitudinally of the grain, and conversely, that if it is positively held against lateral swelling action, it cannot absorb moisture, except perhaps to a slight extent. As the sectors are so arranged that each sector tends to prevent such lateral swelling of the next adjacent sectors, as would tend to increase the circumference of the rim, it follows that by providing a construction which tends to prevent the absorption of moisture, the tendency which moisture may have to increase the circumference of the wheel, is counteracted.

The wheel thus formed is of rigid and durable construction and is well adapted for the particular purposes for which it is designed.

While I have shown the wheel as consisting of four layers of sector shaped pieces of equal thickness, it will be understood that this is merely illustrative, as the number of layers will be varied according to the size of the wheel to be constructed and the thickness of the pieces employed, and it will also be understood that it is immaterial whether the pieces of one layer are of the same, or of different thickness, as compared with those of another layer.

I claim:—

A vehicle wheel comprising a plurality of layers of sector shaped pieces of wood arranged with their vertical portions adjacent to the axis of the wheel and having the grain of the wood of said pieces extending approximately radially of the wheel, and comprising two outer layers having the pieces thereof arranged in substantially radial positions, and two inner layers having the pieces thereof respectively arranged at opposite inclinations to said positions, and clamping bolts extending through all of said layers.

In testimony whereof, I have signed my name to this specification.

FRANCIS S. MERRILL.